(12) United States Patent
Kolmanovsky et al.

(10) Patent No.: US 7,219,004 B2
(45) Date of Patent: May 15, 2007

(54) ADAPTIVE CONTROL FOR ENGINE WITH ELECTRONICALLY ADJUSTABLE VALVE OPERATION

(75) Inventors: Ilya V. Kolmanovsky, Ypsilanti, MI (US); John Ottavio Michelini, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/856,918

(22) Filed: May 27, 2004

(65) Prior Publication Data

US 2004/0216718 A1    Nov. 4, 2004

Related U.S. Application Data

(62) Division of application No. 10/417,014, filed on Apr. 16, 2003, now Pat. No. 6,755,182.

(51) Int. Cl.
*F02D 13/02* (2006.01)
*F02M 51/00* (2006.01)
*G06F 19/00* (2006.01)
*F01L 1/34* (2006.01)

(52) U.S. Cl. .................. 701/104; 123/346; 123/478

(58) Field of Classification Search ........... 123/346, 123/348, 90.11, 90.15–90.18, 478, 480, 491–493; 73/117.3, 118.1, 118.2; 701/103–105, 115
See application file for complete search history.

(56) References Cited

U.S. PATENT DOCUMENTS

| 4,644,474 A | | 2/1987 | Aposchanski et al. |
|---|---|---|---|
| 5,280,770 A | * | 1/1994 | Satou et al. ............. 123/90.15 |
| 5,597,951 A | | 1/1997 | Yoshizaki et al. |
| 5,654,501 A | | 8/1997 | Grizzle et al. |
| 6,189,512 B1 | | 2/2001 | Kawasaki et al. |
| 6,282,485 B1 | | 8/2001 | Kotwicki et al. |
| 6,308,683 B1 | | 10/2001 | Pursifull et al. |
| 6,328,007 B1 | | 12/2001 | Hirasawa et al. |
| 6,386,156 B1 | * | 5/2002 | Stockhausen et al. .... 123/90.15 |
| 6,412,458 B2 | | 7/2002 | Kawasaki et al. |
| 6,513,494 B2 | * | 2/2003 | Kawasaki et al. ....... 123/90.15 |
| 6,553,964 B2 | * | 4/2003 | Arai et al. ............... 123/90.15 |
| 6,571,613 B1 | | 6/2003 | Schenk et al. |
| 6,671,613 B2 | | 12/2003 | Stotsky et al. |
| 6,691,022 B2 | | 2/2004 | Takemura et al. |
| 6,755,182 B1 | * | 6/2004 | Kolmanovsky et al. ..... 123/478 |
| 2001/0037797 A1 | * | 11/2001 | Arai et al. .................. 123/480 |

(Continued)

OTHER PUBLICATIONS

"On the Value of Information in System Identification—Bounded Noise Case", Fogel et al., Automatica, vol. 18, No. 2, pp. 229-238.

(Continued)

*Primary Examiner*—Willis R. Wolfe, Jr.
(74) *Attorney, Agent, or Firm*—Allan J. Lippa; Alleman Hall McCoy Russell & Tuttle, LLP

(57) ABSTRACT

A method is described for estimating cylinder airflow in engines that operate with manifold pressure near atmospheric pressure to compensate for degraded sensor response at such conditions. The method uses an adaptive approach that is updated under preselected engine operating conditions to thereby allow improved accuracy across a variety of engine operation.

12 Claims, 7 Drawing Sheets

U.S. PATENT DOCUMENTS

2002/0092487 A1* 7/2002 Stockhausen et al. .... 123/90.15

OTHER PUBLICATIONS

"Recursive State Bounding by Parallelotopes", Chisci et al., 1996, Automatica, vol. 32, No. 7, pp. 1049-1054.

"Unifying the Landmark Developments in Optimal Bounding Ellipsoid Identification", Deller et al., 1994, International Journal of Adaptive Control and Signal Processing, vol. 8, pp. 43-60.

* cited by examiner

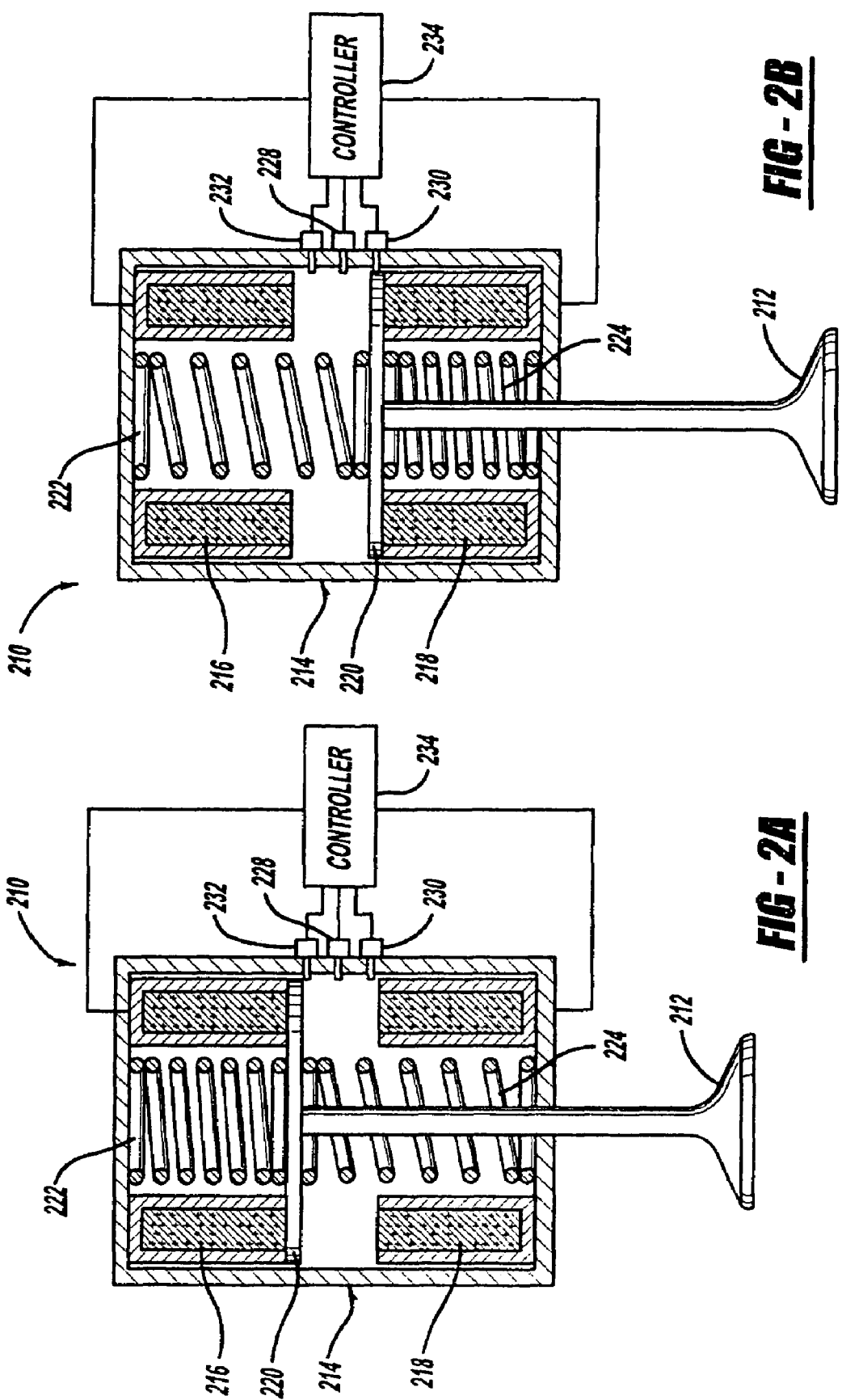

ADAPTIVE CONTROL FOR ENGINE WITH ELECTRONICALLY ADJUSTABLE VALVE OPERATION

CROSS-REFERENCE TO RELATED APPLICATIONS

This application is a divisional application of U.S. patent application Ser. No. 10/417,014, filed April 16, 2003, now U.S. Pat. No. 6,755,182 and hereby incorporated by reference in its entirety for all purposes.

BACKGROUND AND SUMMARY OF THE INVENTION

When operating unthrottled (e.g., without a throttle or at or near wide-open throttle) in an electric valve actuation type engine (or a continuously variable valve lift engine), a mass airflow sensor is degraded due to reverse flow effects leading to erroneous measurement. A manifold pressure sensor (MAP) also cannot be the primary sensor for measuring airflow (e.g., using a speed density approach), as the manifold pressure is substantially near atmospheric pressure during a wide variety of engine conditions. Further, even sensors that provide directional compensation may not be functional at low loads for these engines.

The inventors herein have recognized one approach to overcome these disadvantages. In particular, that is to estimate airflow using engine speed, temperature, and valve timing (additional compensation from an estimate, or measurement, of atmospheric pressure can be used if desired (e.g., from a MAP during engine starting)). But, as the engine ages, this estimate can become degraded. In other words, the engine air-to-fuel ratio control performance can be significantly degraded due to aging and part-to-part variability.

As such, the inventors herein have developed a system to compensate for such effects. The system comprises: an engine with electronically adjustable engine valve timing or valve lift; a sensor coupled to said engine; and a controller for: determining whether a condition is present; when said condition is present, operating in a first mode where an engine air amount is determined based on a valve amount and an adaptive parameter, wherein during said first mode said controller further updates said adaptive parameter based on said sensor; and operating in a second mode where said engine air amount is determine based on said valve amount and said adaptive parameter.

In this way, it is possible to utilize the adaptive information across multiple engine operating modes, and even in modes where adaptation is not possible or where adaptation is limited.

BRIEF DESCRIPTION OF THE FIGURES

The above features, and advantages will be readily apparent from the following detailed description of an example embodiment of the invention when taken in connection with the accompanying drawings.

FIG. 2a show a schematic vertical cross-sectional view of an apparatus for controlling valve actuation, with the valve in the fully closed position;

FIG. 2b shows a schematic vertical cross-sectional view of an apparatus for controlling valve actuation as shown in FIG. 1, with the valve in the fully open position;

DETAILED DESCRIPTION AND EXAMPLE EMBODIMENT OF THE INVENTION

Figure 1:
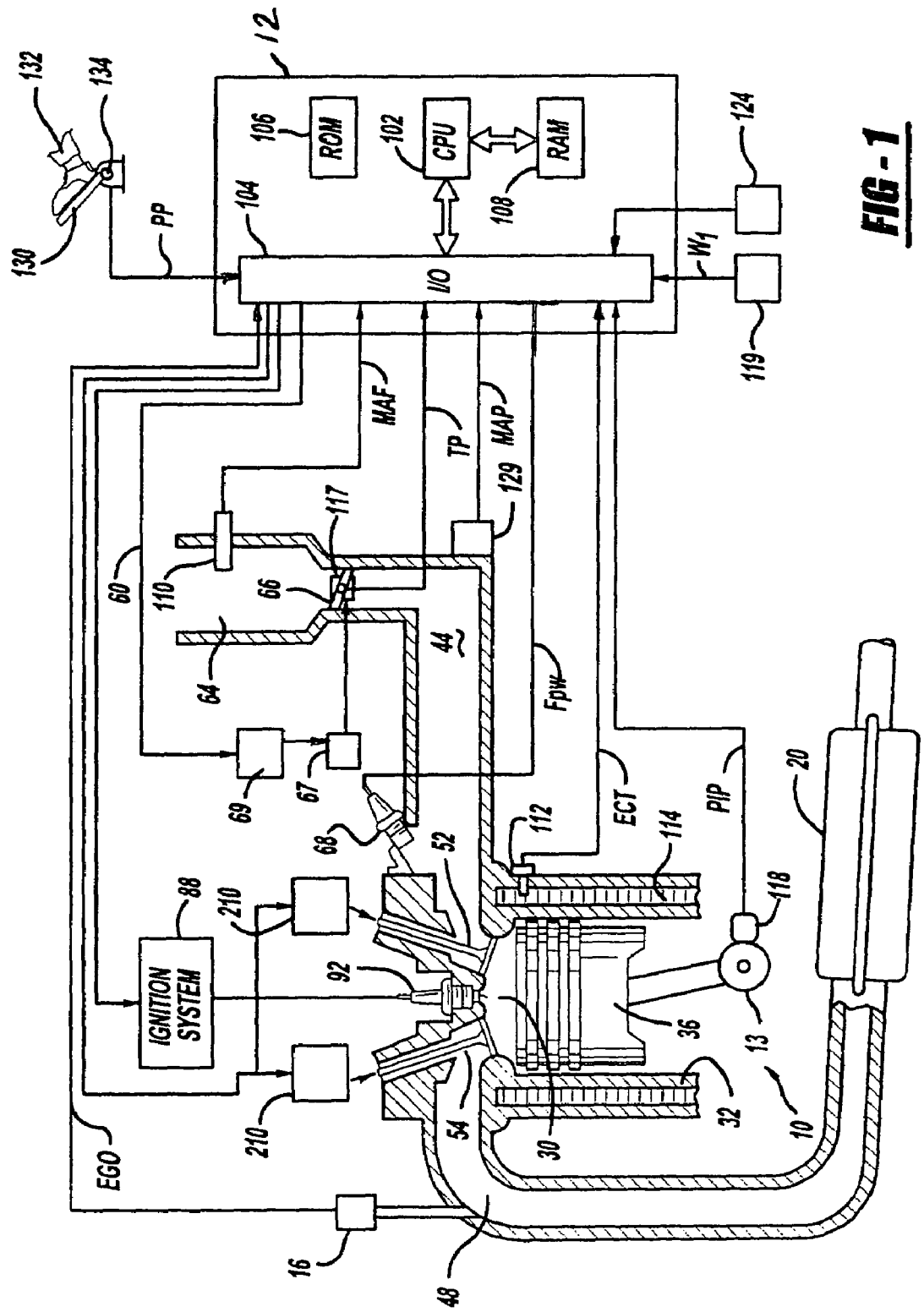
FIG. 1 is a block diagram of a vehicle illustrating various components related to the present invention.

Referring to FIG. 1, internal combustion engine 10 is shown. Engine 10 is an engine of a passenger vehicle or truck driven on roads by drivers. Engine 10 is coupled to torque converter via crankshaft 13. The torque converter is also coupled to transmission via turbine shaft. The torque converter has a bypass clutch, which can be engaged, disengaged, or partially engaged. When the clutch is either disengaged or partially engaged, the torque converter is said to be in an unlocked state. The turbine shaft is also known as transmission input shaft. The transmission comprises an electronically controlled transmission with a plurality of selectable discrete gear ratios. The transmission also comprises various other gears such as, for example, a final drive ratio. The transmission is also coupled to tires via an axle. The tires interface the vehicle to the road.

Internal combustion engine 10 comprising a plurality of cylinders, one cylinder of which, shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In one example, converter 20 is a three-way catalyst for converting emissions during operation about stoichiometry.

As described more fully below with regard to FIGS. 2a and 2b, at least one of, and potentially both, of valves 52 and 54 are controlled electronically via apparatus 210.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. In an alternative embodiment, no throttle is utilized and airflow is controlled solely using valves 52 and 54. Further, when throttle 66 is included, it can be used to reduce airflow if valves 52 or 54 become degraded.

Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure from MAP sensor 129, a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Referring to FIGS. 2a and 2b, an apparatus 210 is shown for controlling movement of a valve 212 in camless engine 10 between a fully closed position (shown in FIG. 2a), and a fully open position (shown in FIG. 2b). The apparatus 210 includes an electromagnetic valve actuator (EVA) 214 with upper and lower coils 216, 218 which electromagnetically drive an armature 220 against the force of upper and lower springs 222, 224 for controlling movement of the valve 212.

Switch-type position sensors 228, 230, and 232 are provided and installed so that they switch when the armature 220 crosses the sensor location. It is anticipated that switch-type position sensors can be easily manufactured based on optical technology (e.g., LEDs and photo elements) and when combined with appropriate asynchronous circuitry they would yield a signal with the rising edge when the armature crosses the sensor location. It is furthermore anticipated that these sensors would result in cost reduction as compared to continuous position sensors, and would be reliable.

Controller 234 (which can be combined into controller 12, or act as a separate controller) is operatively connected to the position sensors 228, 230, and 232, and to the upper and lower coils 216, 218 in order to control actuation and landing of the valve 212.

The first position sensor 228 is located around the middle position between the coils 216, 218, the second sensor 230 is located close to the lower coil 218, and the third sensor 232 is located close to the upper coil 216.

As described above, engine 10, in one example, has an electro-mechanical valve actuation (EVA) with the potential to maximize torque over a broad range of engine speeds and substantially improve fuel efficiency. The increased fuel efficiency benefits are achieved by eliminating the throttle, and its associated pumping losses, (or operating with the throttle substantially open) and by controlling the engine operating mode and/or displacement, through the direct control of the valve timing, duration, and lift, on an event-by-event basis.

The estimation of the airflow into the engine can be based on a static model developed from nominal engine mapping data. For example, if N is engine speed and T is intake temperature, then cylinder flow can be estimated with a static model (EQN. 1) as $$W_{cyl} = $$ EQN. 1

$$W_{cyl,0} = \frac{N}{T}(k_0 + k_1 V_{IVC} + k_2(V_{EVC} - V_{IVO}) + k_3(V_{IVC})N + k_4(V_{EVC} - V_{IVO})N + k_5 V_{IVO})$$

Here, $V_{IVC}$, $V_{EVC}$, $V_{IVO}$ are cylinder volumes at intake valve closing timing, exhaust valve closing timing and intake valve opening timing, respectively, and the coefficients are determined in the calibration phase, and may depend on valve mode (i.e., whether intake and/or exhaust valves are alternating or not from cycle to cycle.) Note that the term $W_{cyl,0}$ represents a baseline cylinder airflow.

Figure 2C:
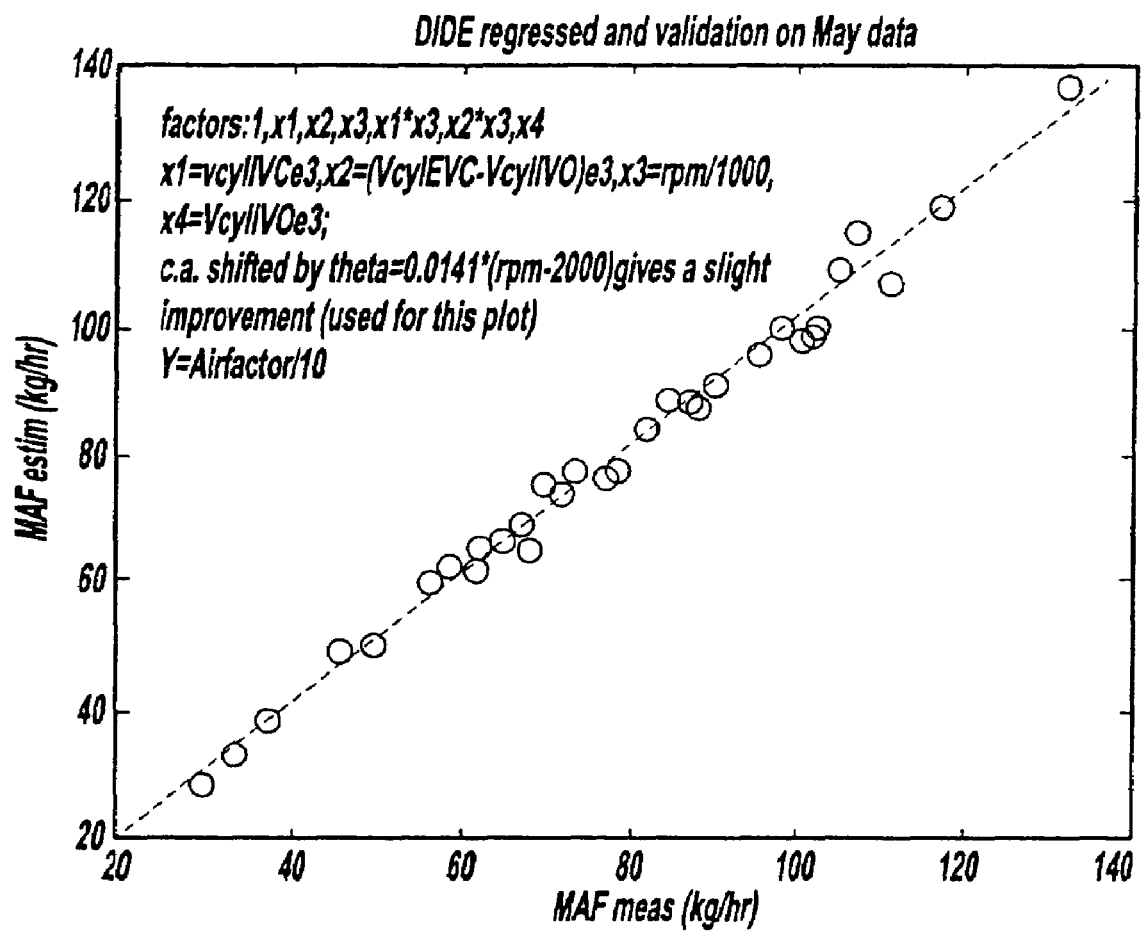
FIG. 2c is a graph illustration experimental data.

FIG. 2c shows that accurate prediction of the cylinder flow can be obtained with such a static cylinder flow model at nominal conditions.

The inventors herein have recognized that the part-to-part variability and engine aging effects render this static model inaccurate over time. A more accurate representation of the cylinder flow model over time is of the form of EQN. 2

$$W_{cyl} = \theta_0 W_{cyl,0} + \theta_1$$ EQN. 2 where $\theta_0, \theta_1$ are unknown parameters (scale and offset). These parameters are estimated adaptively as shown below with regard to FIG. 3. In this way, it is possible to provide a more accurate determination of cylinder airflow. Note that in this example, both an offset and a scalar adaptive parameter are utilized. Other alternative methods could use just one parameter, or other types of adaptive parameters such as nonlinear term.

One example of the present invention advantageously utilizes throttle 66 as an acoustic flap, i.e. the throttle is closed to create vacuum during a predetermined set of engine operating conditions and thereby reduce engine noise and allow adaptation. In other words, one embodiment of engine 10 utilizes the optional throttle plate to mitigate the effects of the acoustic noise disturbances. Such a flap nominally does not create a significant pressure drop (to minimize the effect on fuel economy) in the intake manifold but is closed just slightly to reduce the escape of undesirable induction noise. In an alternative embodiment, a simple two-position type electric valve could be used as the acoustic flap. Further, still, purely mechanical valve could be used to create a depression during certain operating conditions, such as engine speed, by using, for example, a governor type valve.

The inventors recognized that it is possible to use this flap for an additional purpose, specifically, to create conditions under which adaptation of the cylinder flow model becomes possible. If flap is closed sufficient to create a pressure drop in the intake manifold, then the flow will change as:

$$W_{cyl} = (\theta_0 W_{cyl,0} + \theta_1)\frac{p}{p_{atm}}$$ EQN. 3 where p is the intake manifold pressure (equal to atmospheric $p_{atm}$ when flap is open). In one example, p is measured via manifold pressure sensor 129, and $p_{atm}$ is measured from the sensor when the flap is fully open. Note that the adjustment ($p/p_{atm}$) is an optional correction, and various others could be used to account for small pressure drops in the intake manifold system.

If p is lower than atmospheric pressure by at least a predetermined amount (e.g., 5 kPa, or 3–7 kPa in another example), the MAF sensor (which measures throttle flow, $W_{th}$) functions sufficiently well and the intake manifold pressure dynamics are accurately described by the isothermal emptying and filling relation of EQN 4:

$$\dot{p} = \frac{RT}{V_m}(W_{th} - W_{cyl}) = \frac{RT}{V_m}\left\{W_{th} - (\theta_0 W_{cyl0} + \theta_1)\frac{p}{p_{atm}}\right\}. \quad \text{EQN. 4}$$

Although the intake manifold pressure is measured with a sensor, in an alternative embodiment, it can be also estimated based on the estimates of unknown parameters and the same isothermal intake manifold filling and emptying model of EQN. 5:

$$\dot{\hat{p}} = \frac{RT}{V_m}\left\{W_{th} - (\hat{\theta}_0 W_{cyl0} + \hat{\theta}_1)\frac{p}{p_{atm}}\right\} + K(p - \hat{p}), \quad \text{EQN. 5}$$

where K>0 is an estimator gain, selected based on engine calibration. After initial transients, the error between estimated and measured pressure should approach zero if the parameters are estimated correctly. Hence, the pressure estimation error can be used to drive parameter adaptation till the error between measured pressure and estimated pressure is eliminated.

To achieve this, the following parameter update laws of EQNS 6–7 are utilized:

$$\dot{\hat{\theta}}_0 = -L_0(p - \hat{p})W_{cyl0}\frac{p}{p_{atm}}, \quad \text{EQNS. 6-7}$$

$$\dot{\hat{\theta}}_1 = -L_1(p - \hat{p})\frac{p}{p_{atm}}$$

where $L_0, L_1$ are gains determining how fast adaptation of each parameter proceeds.

Note that in an alternative embodiment, the right hand-sides of the adaptation laws can be normalized by dividing them, respectively, by EQN. 8.

$$\sqrt{1 + \left(W_{cyl0}\frac{p}{p_{atm}}\right)^2}, \quad \text{EQN. 8}$$

$$\sqrt{1 + \left(\frac{p}{p_{atm}}\right)^2}$$

Finally, as another alternative embodiment, adaptation is enabled on close to steady state conditions only to eliminate the error between measured throttle flow and estimated cylinder flow. In this case, EQNS. 6–7 are modified to replace (p-phat) with Wth-Wcyl_hat. Wcyl_hat is given by equation 3.

Figure 3:
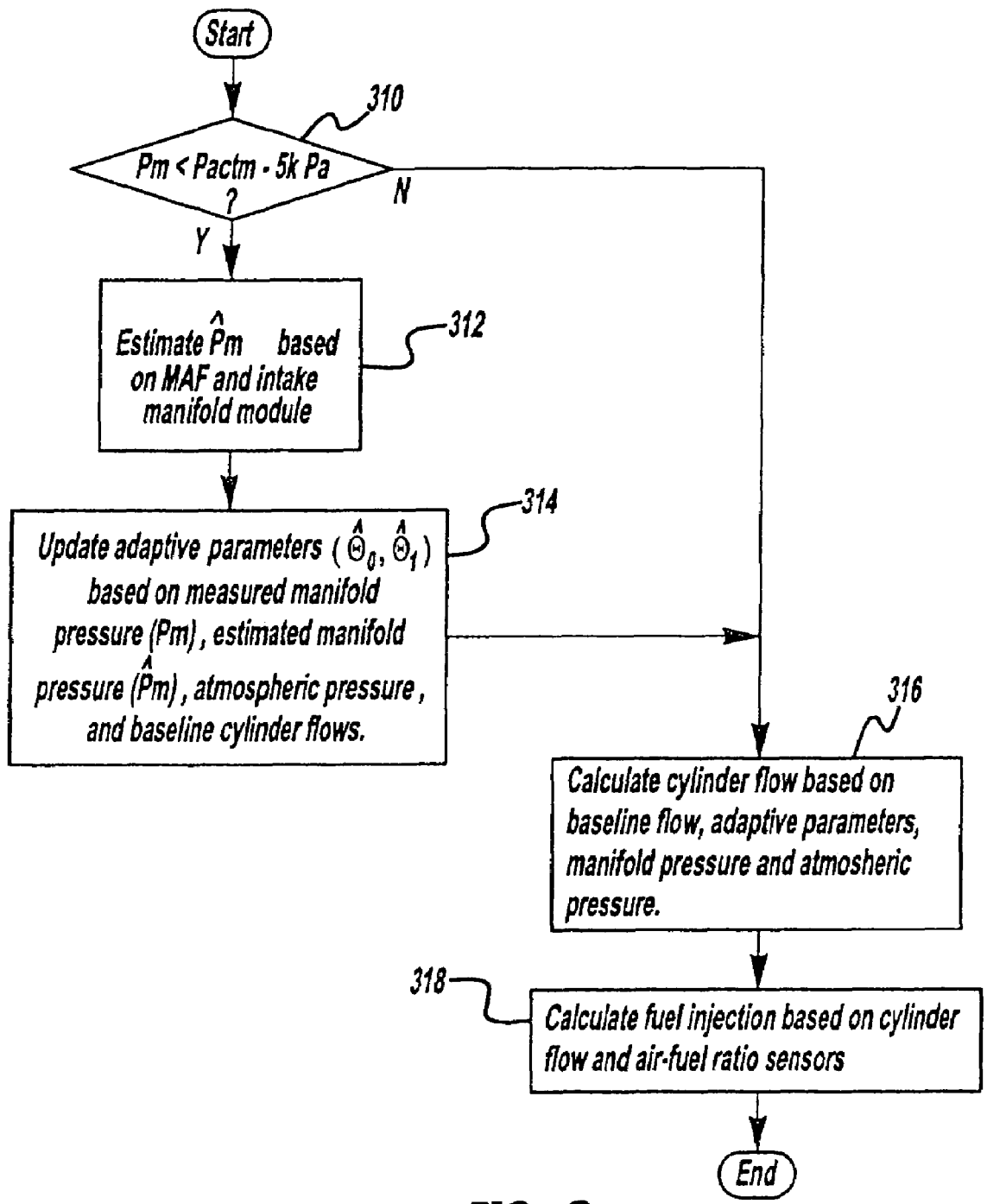
FIGS. 3–5 are high level flowcharts for use with the present invention.

Referring now specifically to FIG. 3, a routine for performing the adaptation is shown. First, in step 310, the routine determines whether a specific condition is present that allows for adaptation. In this example, the routine determines whether manifold pressure (measured or estimated) is less than atmospheric pressure minus a margin (5 Kpa in this example). Note, however, that various other determinations can be used to determine whether to enable (or disable) adaptive learning, such as, for example:

if pressure estimation error is sufficiently small, then the routine can disable the parameter updates;

if the nominal cylinder flow estimate is sufficiently high (exceeds a pre-determined threshold) then the routine can disable offset adaptation (but continue scalar adaptation); and/or if the nominal cylinder flow estimate is sufficiently low (is below a pre-determined threshold) then the routine can disable scale adaptation (but continue offset adaptation).

When the answer to step 310 is YES, the routine continues to step 312 where estimated manifold pressure is determined according to EQN. 5. In one case, the routine uses the mass airflow signal to estimate Wth, along with manifold pressure and atmospheric pressure (and manifold temperature T) to calculate the estimated manifold pressure ($\hat{p}$).

Then, in step 314, the routine uses EQNS. 6–7 to update the adaptive parameters based on the measured and estimated manifold pressure, and atmospheric pressure. The adaptive gains L0 and L1 can be fixed, or adjusted based on various engine operating parameters, and are generally determined by engine calibration.

Next, in step 316, from either step 314 or a NO from 310, the routine calculates the cylinder flow based on the adaptive parameters and the baseline cylinder flow. In other words, the routine uses EQNS. 1–3 to calculate the cylinder airflow. Finally, in step 318 the routine determines a fuel injection amount based on the calculated cylinder airflow, along with feedback from air-fuel ratio sensors and a desired air-fuel ratio.

In another aspect of the invention, when the engine does not have a capability to close the flap to create a sufficient depression in the intake manifold or does not have a flap, an alternative adaptation approach can be used. In this case, the method uses UEGO sensor (air-to-fuel ratio) measurements for adaptation.

With the flap at wide-open conditions (or with no flap), the cylinder airflow can again be characterized as shown in EQN. 9:

$$W_{cyl} = \theta_0 W_{cyl,0}, \quad \text{EQN. 9}$$

Further, the injected fueling rate is, at close to steady-state conditions, governed by EQN. 10.

$$W_f = \theta_2 + k_f p_w, \quad \text{EQN. 10}$$

In other words, the injected fueling rate can be estimated as a sum of an unknown parameter, $\theta_2$, (which accounts for injector drifts or injector deposits and will be adaptively learned as shown below), and a product of a known coefficient, $k_f$, (determined from injector calibration), and commanded injector pulse-width, $p_w$ (or fpw). In close to steady-state conditions, the UEGO sensor reading is labeled as $\lambda$. Then as shown by EQN. 11, the following equation governs operation:

$$\theta_0 W_{cyl,0} - \theta_2 \lambda - k_f p_w \lambda = \epsilon \approx 0, \quad \text{EQN. 11}$$

where $\epsilon$ represents an unknown noise term with a known bound $|\epsilon| \leq \Delta$. The noise accounts for UEGO drifts and discrepancies between fully steady-state conditions and close to steady-state conditions. The bound is a tunable parameter of the algorithm, and is set in the calibration phase.

Each sample, n, the engine management system (controller 12 in one example) determines that close-to-steady state conditions are entered, the UEGO measurement provide a new condition that the unknown parameters need to satisfy in the form of two linear inequalities of EQN. 12

$$-\Delta \leq \theta_0 W_{cyl,0}{}^n - \theta_2 \lambda^n - k_f p_w{}^n \lambda^n \leq \Delta \qquad \text{EQN. 12}$$

Here the superscript n identifies cylinder flow estimate, injector pulse-width and UEGO sensor reading during the n-th time instant when close to steady-state conditions are entered. These two inequalities can be intersected with the inequalities obtained from the prior entering in close to steady-state conditions, 1, 2, 3, ..., n–1, to tighten the bounds on the unknown parameters.

To implement the intersection of the inequalities in a computationally efficient fashion suitable for on-line implementation, different techniques can be used. One example is the use of the method of the optimal bounding ellipsoids described in J. R. Deller, M. Nayeri and M. S. Liu (1994), "Unifying the Landmark Developments in Optimal Bounding Ellipsoid Identification", *International Journal of Adaptive Control and Signal Processing* 8(1), 43–60. In addition, the method described in Fogel and Huang, or Chisci, Garulli and Zappa can also be used. (Eli Fogel and Y. F. Huang (1982), "On the Value of Information in System Identification—Bounded Noise Case", *Automatica* 18(2), 229–238; (L. Chisci, A. Garulli, and G. Zappa, Recursive State Bounding by Parallelotopes (1996), *Automatica* 32(7), 1049–1055).

In such a method, the parameter bounds are in the form of an ellipsoid (EQN. 13), $$\left\{ \hat{\theta} = \begin{pmatrix} \hat{\theta}_0 \\ \hat{\theta}_2 \end{pmatrix} \middle| \begin{pmatrix} \hat{\theta} - \hat{\theta}_n \end{pmatrix}^T P_n \begin{pmatrix} \hat{\theta} - \hat{\theta}_n \end{pmatrix} < 1 \right\}, \qquad \text{EQN. 13}$$

where $P_n$ is a 2×2 matrix and $\hat{\theta}_n$ is the 2×1 vector that identifies the center of the ellipsoid. The value of $\hat{\theta}_n$ is used to define present parameter estimates.

Explicit formulas can be given for obtaining $P_n \hat{\theta}_n$ from $P_{n-1}$, $\hat{\theta}_{n-1}$.

Note that in each step the algorithm tightens the bounds on the unknown parameters, unlike the conventional adaptation schemes that may not always provide continuous improvement and, in initial transients, may diverge from the true parameter values.

While the inventors believe that adapting two parameter estimates for the cylinder flow and one parameter estimate for the injectors should be sufficient, the invention can be equally well applied to cases when more parameters are utilized in model parameterization. Furthermore, instead of the method of the optimal bounding ellipsoids, the method can use the optimal bounding parallelotopes described in L. Chisci, A. Garulli, and G. Zappa, "Recursive State Bounding by Parallelotopes, *Automatica*, 32(7), 1996, pp. 1049–1055.

Finally, adaptation on a cylinder-by-cylinder basis is also possible, provided that the air-to-fuel ratio values for each cylinder can be reliably determined from the pulses off the air-to-fuel ratio sensor using one of the techniques known in the art.

Figure 4:
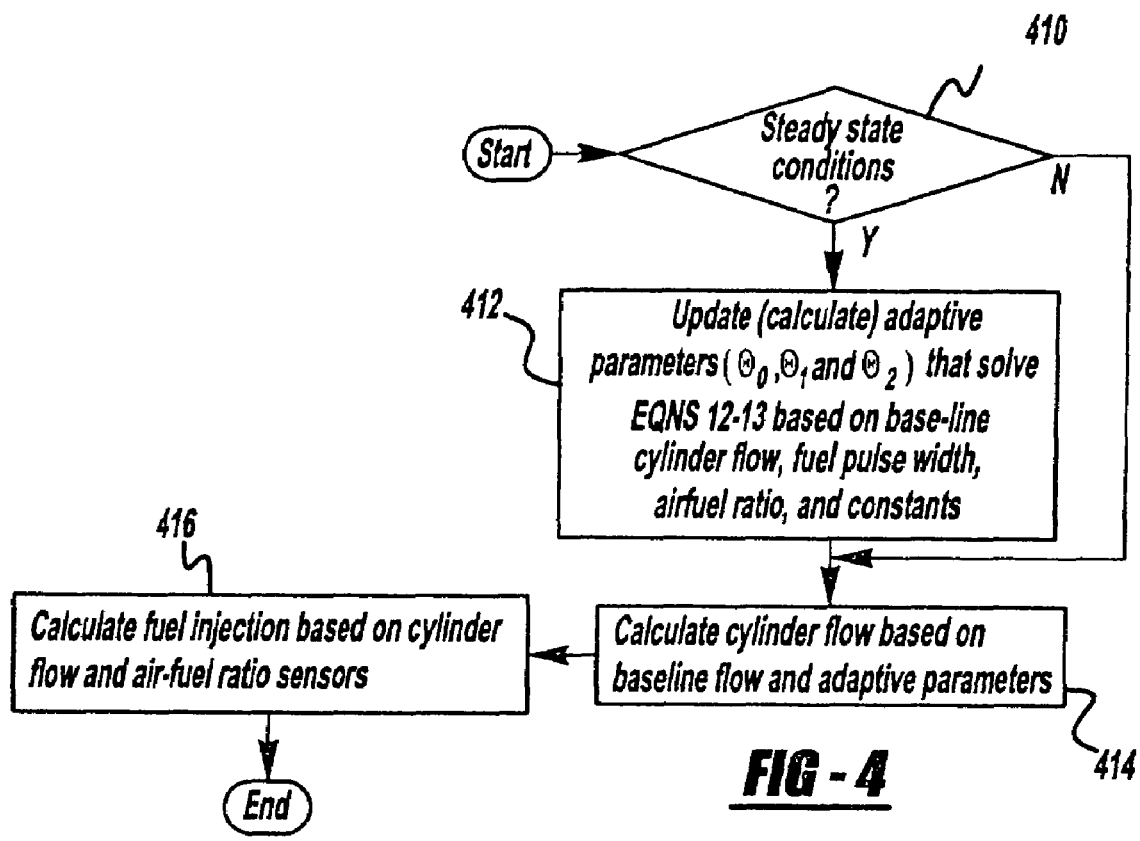

Referring now to FIG. 4, a routine is described for implementing this alternative approach. Specifically, in step 410 a determination is made as to whether steady state conditions are present. This determination can be made based on whether feedback correction in air-fuel ratio adjustment are within prescribed ranges, or based on the rate of change of manifold pressure or mass air flow, or various other approaches.

When the answer to step 410 is YES, the routine continues to step 412. In step 412, the routine updates the adaptive parameters that solve EQNs. 12–13 based on the base-line cylinder flow, fuel pulse width, air-fuel ratio, and various constants.

Next, from either step 412 or step 410 (NO), the routine continues to step 414, where the routine calculates the cylinder flow based on the baseline flow and the adaptive parameters. Then, in step 416, the routine calculates the fuel injection based on cylinder flow and air-fuel ratio sensor feedback signals.

Figure 5:
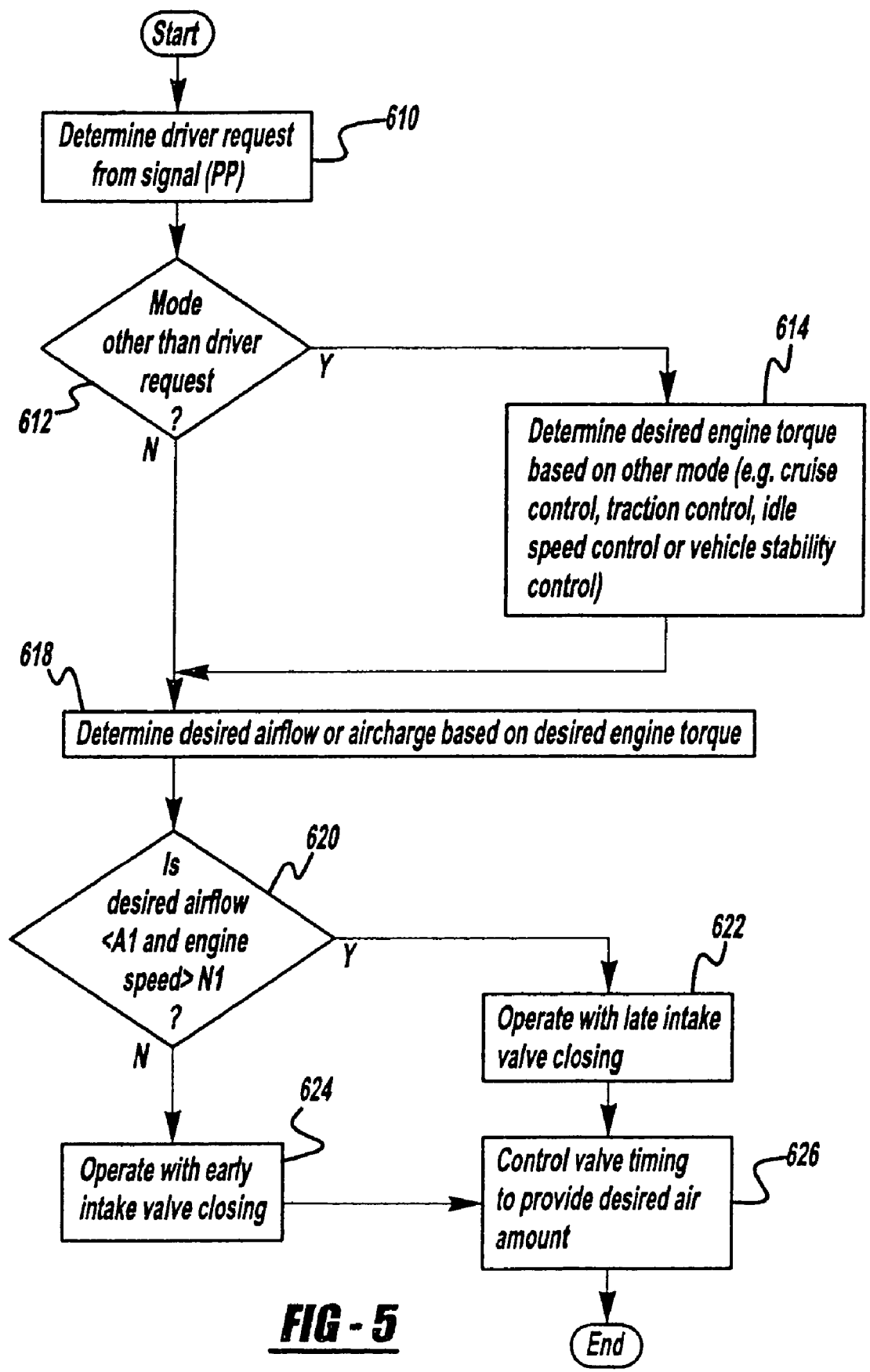

Referring now to FIG. 5, a routine is described for determining the requested engine torque, and engine air flow, and based thereon controlling engine valve timing. I.e., adjusts valve timing or valve lift to control estimated/measured airflow (and/or torque) to a desired value. First, in step 610, the routine determines the driver request from signal (PP). For example, the routine determines a requested drive torque based on pedal position, and optionally adjusted based on vehicle speed. Further, various other driver requests approaches can be used. From step 610, the routine continues to step 612, where a determination is made as to whether the vehicle is operating in a mode other than the driver request mode. Other such modes include, for example, a cruise control mode where vehicle speed is used with a vehicle speed set point to control engine operation, traction control, where wheel slip is used to control engine output, idle speed control where engine speed is feedback controlled independent of driver input, or vehicle stability control. When the answer to step 612 is "yes", the routine continues to step 614 and determines the desired engine torque based on the other operating mode.

Alternatively, when the answer to step 612 is "no", the routine continues to step 616 and determines the desired engine torque based on the driver request in step 610. For example, the routine can calculate desired engine torque based on the desired wheel torque and other parameters including gear ratio, and torque ratio across the torque converter. Then, the routine continues to step 618 and determines the desired airflow based on the desired engine torque. This can be performed using engine maps including parameters such as engine speed, engine coolant temperature, air-fuel ratio, and various others. Alternatively, the routine can determine the desired air amount such as an air charge value based on the desired engine torque.

From step 618 the routine continues to step 620 to determine whether the desired airflow is less than a first threshold A-1 and whether engine speed is greater than a second threshold N-1. When the answer to step 620 is "no", the routine continues to step 622 to operate with intake valve closing timing after bottom dead center of piston movement. Alternatively, when the answer to step 620 is "no" the routine continues to step 624 to operate with valve closing timing of the intake valve before bottom dead center of piston movement. Note that the operation according to steps 622 and 624 can be referred to as late intake valve closing and early intake valve closing depending on whether the intake valve closing timing is before or after bottom dead center of the piston movement during the intake stroke.

Finally, in step 626, the routine controls valve timing (either early or late) to provide the desired air amount, and to thereby provide the desired engine torque and finally thereby to provide the desired driver request.

Figure 6:
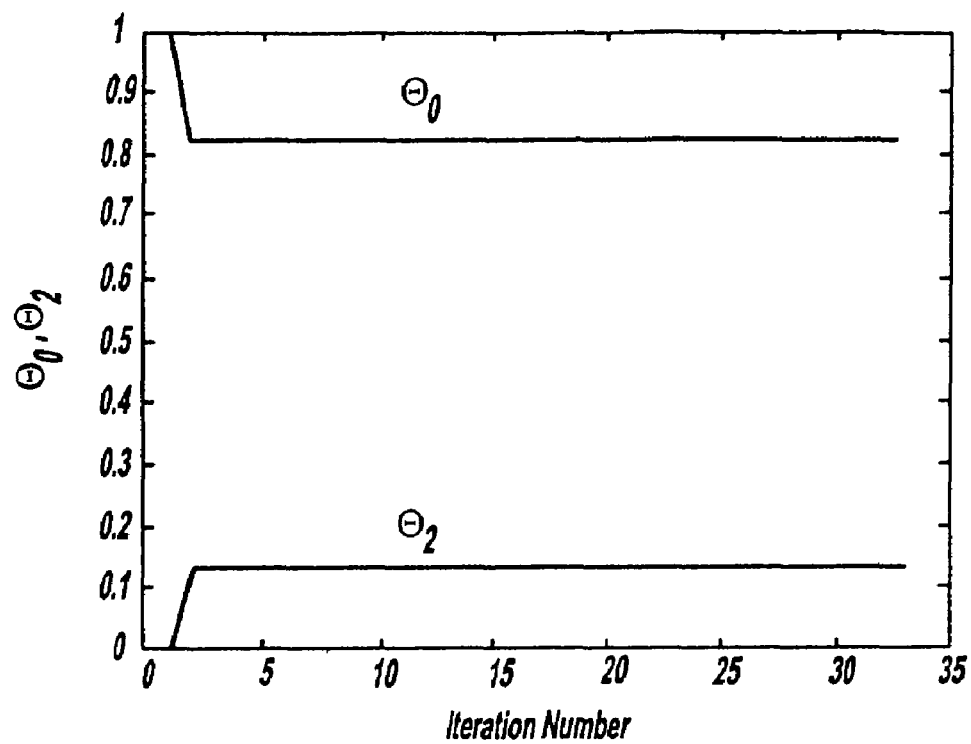
FIGS. 6–7 show experimental results by operation according to various features of example embodiments of present invention.
Figure 7:
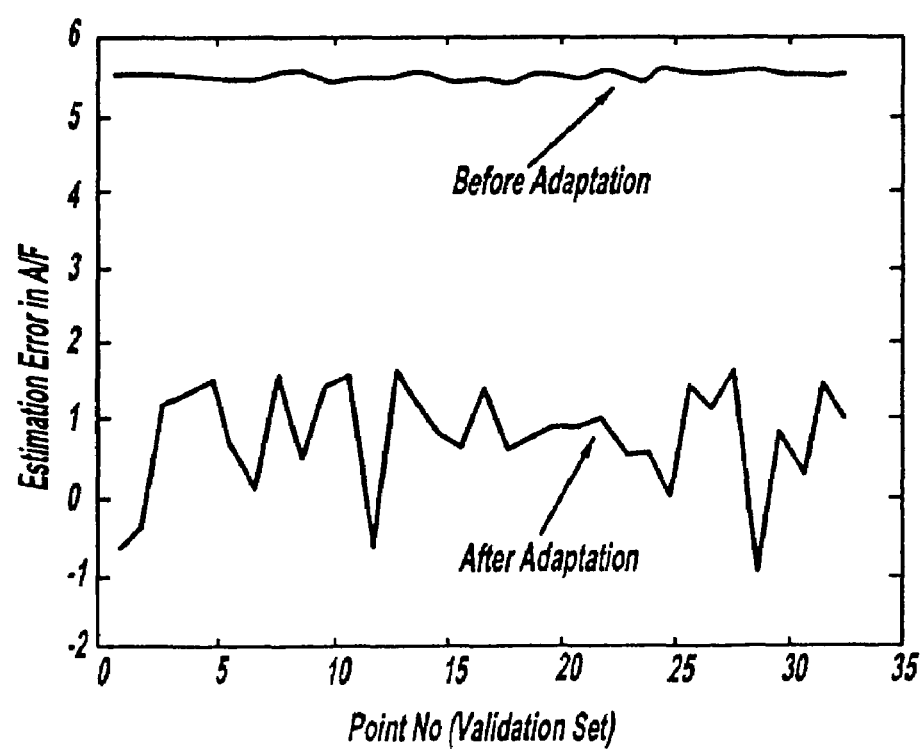

Referring now to FIG. 6–7, experimental results according to the routines described above are shown. Specifically, FIG. 6 shows variations in the parameters (θ0 and θ2), and FIG. 7 shows the error before and after adaptation. As such, the above aspects of the present invention are able to account for variations in physical parameters through adaptation and thereby reduce estimation error. This results in increased air-fuel ratio accuracy and reduced emissions.

We claim:

1. A system comprising:
 an engine with electronically adjustable engine valve timing or valve lift;
 an exhaust gas oxygen sensor coupled in an exhaust system of the engine; and
 a controller for:
  determining whether a steady state condition is present;
  when said condition is present, operating in a first mode where an engine air amount is determined based on a valve amount and an adaptive parameter, said adaptive parameter being updated to compensate for part variability and wear, wherein during said first mode said controller updates said adaptive parameter based on said sensor;
  operating in a second mode where said engine air amount is determine based on said valve amount and said adaptive parameter; and
  adjusting an injected fuel amount based on said engine air amount, wherein said adaptive parameter is not updated during said second mode.

2. The system of claim 1 where said controller updates said adaptive parameter based on an error between an estimated and a measured parameter.

3. A system comprising:
 an engine with electronically adjustable engine valve timing or valve lift;
 a sensor coupled to said engine; and
 a controller for:
  determining whether a condition is present;
  when said condition is present, operating in a first mode where an engine air amount is determined based on a valve amount and an adaptive parameter, said adaptive parameter being updated to compensate for part variability and wear, wherein during said first mode said controller updates said adaptive parameter based on said sensor; and
  operating in a second mode where said engine air amount is determine based on said valve amount and said adaptive parameter, wherein said adaptive parameter is not updated during said second mode.

4. The system of claim 3 wherein said sensor is a mass air flow sensor.

5. The system of claim 3 wherein said controller determines whether said condition is present by determining whether the engine is operating in a steady state condition.

6. The system of claim 3 wherein said valve amount is an engine valve timing or valve lift.

7. The system of claim 3 wherein said controller further determines said engine air amount based on an engine speed and manifold temperature.

8. The system of claim 3 wherein said controller determines said engine air amount independent of said sensor during said second mode.

9. The system of claim 3 where said controller updates said adaptive parameter based on an error between an estimated and a measured parameter.

10. The system of claim 3 wherein said controller determines whether said condition is present by determining whether said sensor is operating.

11. The system of claim 10 wherein said controller determines whether said sensor is operating by determining whether manifold pressure is less than a specified value.

12. The system of claim 11 wherein said sensor is a mass air flow sensor.

* * * * *